C. W. ANDERSON.
RATCHET CLUTCH FOR DRIVE MECHANISM.
APPLICATION FILED MAY 28, 1919.
1,423,172.
Patented July 18, 1922.
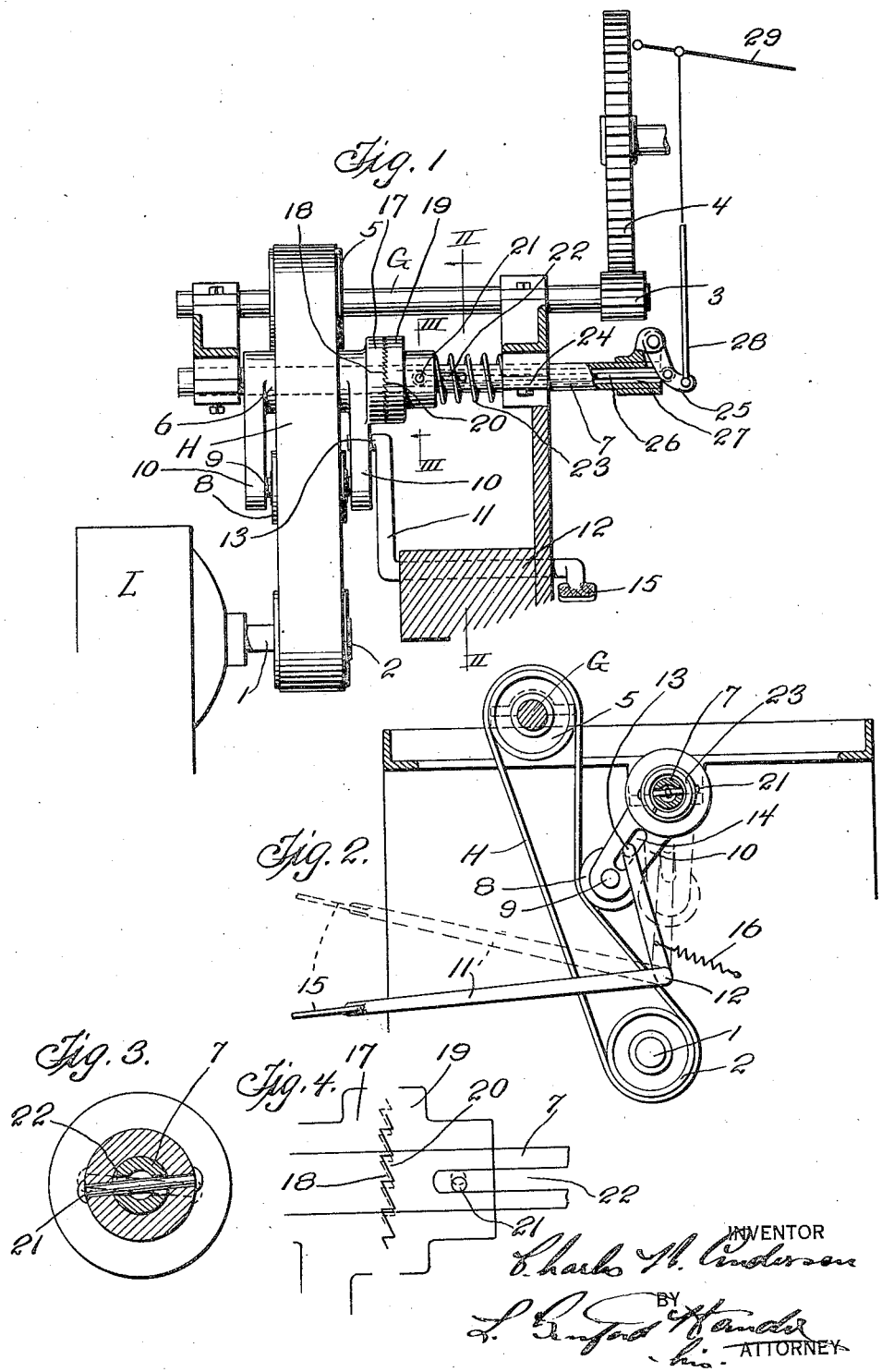

UNITED STATES PATENT OFFICE.

CHARLES W. ANDERSON, OF BROOKLYN, NEW YORK.

RATCHET CLUTCH FOR DRIVE MECHANISM.

1,423,172.     Specification of Letters Patent.    Patented July 18, 1922.

Application filed May 28, 1919. Serial No. 300,303.

*To all whom it may concern:*

Be it known that I, CHARLES W. ANDERSON, residing at Brooklyn, in the county of Kings and State of New York, have invented certain new and useful Improvements in Ratchet Clutches for Drive Mechanism, of which the following is a specification.

This invention relates to a ratchet clutch for drive mechanism and is particularly adapted for use in connection with hod elevators and the like.

The invention herein shown and described is an improvement over the structure disclosed in my pending application Serial No. 161,344, filed April 11, 1917.

A particular object of the present improvement is to provide a belt-tightener in which likelihood of undue stress being placed upon the belt during operation is avoided, to the end that the effective life of the belt may be prolonged and the general efficiency of the belt-tightener improved.

A more detailed object is to provide a clutch mechanism of such construction that the belt-tightening roller controlled thereby will not, at any time, be maintained by the clutch in its position of maximum tightness.

A further detailed object is to provide a clutch which, while it is effective at all times to compensate for any stretching of the belt during use, will at the same time afford a desirable degree of lost motion which will permit the belt-tightening roller to assume, during the operation of the device, only a degree of tightness which may be here referred to as an ideal degree.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:—

Fig. 1 is a side elevational view of a belt-tightening device for hod elevators, the same being shown as constructed along the general lines as that illustrated in the copending application above referred to, and illustrating a clutch mechanism in association therewith constructed in accordance with this invention.

Fig. 2 is a vertical sectional view taken upon the plane of line II of Fig. 1.

Fig. 3 is an enlarged detail sectional view taken upon the plane of line III of Fig. 1, and Fig. 4 is a diagrammatic view for illustrating different positions of parts of the clutch mechanism.

Referring to the drawings for describing in detail the structure which is illustrated therein, the reference character L indicates a motor having a drive shaft 1 and a drive pulley 2.

The reference character G indicates a shaft carrying a pinion 3 for engaging the drive gear 4 of a hod elevator or the like, said shaft G also carrying a pulley 5 to be driven from the pulley 2.

A slack belt H extends between the pulleys 2 and 5.

The belt-tightener includes a body member 6 which is mounted to oscillate upon a fixed shaft 7 arranged substantially parallel to the shafts 1 and G, and adapted to hang below said shaft G. At its lower end the body member 6 is provided with a belt-tightening roller 8 which is mounted upon a pin 9 extending between spaced arms 10, of said member 6.

Normally the roller 8 hangs free of the belt H. Any suitable means may be employed for swinging the roller manually into engagement with the belt when desired. Two examples of such means are illustrated in my copending applications Serial No. 161,344 and Serial No. 300,304, the former illustrating a hand control, and the latter illustrating a foot lever control similar to that shown in Fig. 2. The lever, in Fig. 2, is indicated by the reference numeral 11. It is pivotally mounted, as at 12, and has a pin 13 engaging within a slot 14 formed in one of the arms 10 in such relation that downward pressure upon the outer end 15 of the lever will swing the roller 8 forcefully against the belt. A spring, or other suitable means, as 16, may be arranged to normally retain the end 15 of the lever elevated so that the roller will not press against the belt.

Due to the slackness of the belt H, no motion is transmitted from the pulley 2 to the pulley 5, except when the roller 8 is pressing against the belt.

The body member 6 is provided with a clutch member 17 at one side thereof, concentric with the shaft, the outer face of the clutch member being formed with suitable ratchet teeth 18 thereon.

A cooperating clutch member 19 is mounted upon the shaft 7 to slide longitudinally thereon toward and away from the clutch member 17, the opposing face of the clutch member 19 being provided with teeth 20 for engaging the teeth 18. A pin 21, carried by the clutch member 19, extends transversely through a slot 22 formed in the shaft 7. The pin is of such width relative to the width of the slot, as to permit a limited rotary movement of the clutch member 19 about the shaft 7, thus providing a certain desirable degree of lost motion as between the teeth of the clutch members 17 and 19.

A spring 23 is interposed between the clutch member 19 and the opposing face of the adjacent support 24 of the shaft adapted to urge the clutch member 19 at all times toward and into engagement with the clutch member 17.

Any desired means may be employed for moving the clutch member 19 against the pressure of the spring 23, as occasion may require. An example of such means is illustrated herein and conforms in principle to the structure disclosed in the copending application Serial No. 161,344. It includes a small arm 25 pivotally mounted at one end of the shaft 7 and being connected by a link 26 with the pin 21, said link 26 being extended longitudinally of the shaft 7 through a central bore 27 formed in said shaft to receive it. The arm 25 carries a chain, or link, 28 which extends into connection with an automatic control lever 29 by which the arm may be automatically swung to pull back the clutch member 19 whenever the control lever 29 is lifted.

When the roller 8 is in belt-tightening position, and the clutch members 17 and 19 are in engagement with each other, said clutch members will positively retain the roller 8 in engagement with the belt until the clutch member 19 is drawn backwardly. As soon as the clutch member 19 is drawn backwardly, however, the roller will immediately fall away from the belt and the driving connection between the pulleys 2 and 5 will be broken, and the driving connection will remain broken until the roller is again swung into tightening position.

The lost motion above referred to between the clutch members 17 and 19 is of great importance in that it constitutes the means above referred to for preventing the maintenance of undue pressure of the roller 8 against the belt during the operation of the device. By referring to Figs. 3 and 4 it will be seen that whenever the roller is swung toward the belt the frictional engagement of the teeth of the clutch member 17 with the teeth of the clutch member 19 will, of course, cause the clutch member 19 to rotate with the clutch member 17 until the rotation of the clutch member 19 is arrested by engagement of the pin 21 with the opposite side of the slot 22.

After the clutch member 19 has ceased to rotate, the clutch member 17 will continue to rotate until the roller 8 has been forced tightly against the belt. An operator may at this time force the roller against the belt as tightly as he please, that is, to a degree of tightness which may be here referred to as maximum tightness, but as soon as the manual force applied by the operator is relieved, the teeth of the clutch member 17, moving now in the opposite direction, will engage the teeth of the clutch member 19. The clutch member 19 will not immediately arrest return movement of the clutch member 17 owing to the lost motion of the clutch member 19. The clutch member 19 will rotate with the clutch member 17 until the pin 21 has returned to its first position within the slot 22, that is, from the position shown by dotted lines in Figs. 3 and 4, and the position shown by full lines in said figures. At this point the backward movement of the roller 8 will be arrested, and it is intended that the point, or position, in which backward movement of the roller 8 is arrested is such as to maintain an ideal degree of pressure against the belt, that is, a degree of pressure which is ample for transmitting the desired power from the pulley 2 to the pulley 5 while at the same time applying no unnecessary strains to the belt.

It will, of course, be seen that the effectiveness of the lost motion above referred to for producing the results described, is equally present regardless of whether the belt be a new one, and therefore relatively tight, or an old one, and therefore stretched and relatively loose. If the belt is old and quite loose, the roller 8 will simply swing further before reaching its maximum tightness, and the clutch member 17 will rotate so as to step up another tooth or two relatively to the clutch member 19.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. The combination with a drive pulley, a driven pulley, a slack belt extending between said pulleys, and a belt-tightener movable into and out of belt-tightening position, of means whereby to retain the belt-tightener in belt-tightening position, and said means comprising parts cooperative to retain the belt-tightener only at a degree of tightness which is less than its maximum tightness.

2. The combination with a drive pulley, a driven pulley, a slack belt extending between said pulleys, and a belt-tightener movable into and out of belt-tightening position, of means to manually move the belt-tightener into a position of maximum tightness, and lost motion retaining means for the belt-tightener adapted to retain the belt-tightener only at a degree of tightness which is less than the maximum tightness.

3. The combination with a drive pulley, a driven pulley, a slack belt extending between said pulleys, and a belt-tightener movable into and out of belt-tightening position, of a clutch for retaining the belt-tightener in belt-tightening position, said clutch comprising a pair of interengaging clutch members one carried by the belt-tightener and the other mounted to have a degree of lost motion whereby the clutch is effective only to retain the belt-tightener at a degree of tightness which is less than its maximum tightness.

4. The combination with a drive pulley, a driven pulley, a slack belt extending between said pulleys, and a belt-tightener movable into and out of belt-tightening position, of a shaft upon which the belt-tightener is pivotally mounted to swing, the clutch member slidably mounted upon said shaft to move into and out of engagement with said belt-tightener adapted, when in engagement with the belt-tightener to retain the belt-tightener against unlimited swinging in one direction, and means whereby said clutch member is permitted a limited degree of rotation about said shaft, whereby said clutch member is capable only of retaining the belt-tightener at a degree of tightness which is less than its maximum tightness.

5. The combination with a drive pulley, a driven pulley, a slack belt extending between said pulleys, and a belt-tightener for said belt, said belt-tightener comprising a pivotally mounted body member having a portion arranged to swing into and out of tightening position against the belt, a shaft upon which the body member is pivotally mounted, and means to manually move the belt-tightener against the belt at will, of a clutch member carried by the body member having a toothed surface portion arranged substantially concentric with said shaft, a cooperating clutch member mounted to slide upon said shaft and having a toothed surface for engaging the toothed surface of the first clutch member adapted to cause the two clutch members to move together, and means interengaging between the shaft and the second clutch member of a character to afford a limited rotary movement of the second clutch member about said shaft for the purpose set forth.

In testimony whereof I affix my signature in the presence of two witnesses.

CHAS. W. ANDERSON.

Witnesses:
L. GESSFORD HANDY,
E. W. HAVILAND.